United States Patent
Abernethy, Jr. et al.

(10) Patent No.: US 9,477,940 B2
(45) Date of Patent: Oct. 25, 2016

(54) RELATIONSHIP-CENTRIC PORTALS FOR COMMUNICATION SESSIONS

(75) Inventors: Michael N. Abernethy, Jr., Pflugerville, TX (US); Gabriel A. Cohen, San Mateo, CA (US); Ronald E. Craig, Pittsboro, NC (US); Travis M. Grigsby, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2505 days.

(21) Appl. No.: 11/781,342

(22) Filed: Jul. 23, 2007

(65) Prior Publication Data

US 2009/0031027 A1 Jan. 29, 2009

(51) Int. Cl.
*G06Q 10/10* (2012.01)
(52) U.S. Cl.
CPC .................... *G06Q 10/10* (2013.01)
(58) Field of Classification Search
CPC .................................................. G06Q 10/10
USPC .................... 709/217, 224; 707/5
See application file for complete search history.

(56) References Cited

U.S. PATENT DOCUMENTS

| | | | |
|---|---|---|---|
| 6,351,279 B1 * | 2/2002 | Sawyer | 348/14.07 |
| 7,478,126 B2 * | 1/2009 | Prohel et al. | 709/204 |
| 7,672,845 B2 * | 3/2010 | Beranek | 379/265.09 |
| 8,130,937 B1 * | 3/2012 | Thenthiruperai | H04M 3/5175 379/265.01 |
| 2002/0120712 A1 * | 8/2002 | Maislin | 709/217 |
| 2004/0003097 A1 * | 1/2004 | Willis | G06F 17/30873 709/228 |
| 2004/0044569 A1 * | 3/2004 | Roberts et al. | 705/14 |
| 2005/0283475 A1 * | 12/2005 | Beranek | |
| 2006/0218577 A1 * | 9/2006 | Goodman et al. | 725/32 |
| 2006/0229054 A1 * | 10/2006 | Erola et al. | 455/403 |
| 2006/0234631 A1 * | 10/2006 | Dieguez | 455/41.2 |
| 2007/0118661 A1 * | 5/2007 | Vishwanathan et al. | 709/227 |
| 2007/0214238 A1 * | 9/2007 | Coppens et al. | 709/217 |
| 2008/0144831 A1 * | 6/2008 | Sparrell | 380/277 |
| 2008/0147501 A1 * | 6/2008 | Gilliam | 705/14 |
| 2008/0201143 A1 * | 8/2008 | Olligschlaeger | H04M 3/2281 704/235 |
| 2008/0285527 A1 * | 11/2008 | Sammarco | 370/338 |

\* cited by examiner

*Primary Examiner* — Khaled Kassim
(74) *Attorney, Agent, or Firm* — Jeffrey T. Holman

(57) ABSTRACT

Relationship-centric resources are provided to users during a communication session. After establishing a communication session between a first communication device and a second communication device, content that meets a content descriptor is retrieved. This content descriptor describes a nature of a relationship between users of the first and second communication devices. The retrieved content, which meets the content descriptor, is then simultaneously displaying on both the first communication device and the second communication device.

19 Claims, 7 Drawing Sheets

| NAME | MAIL ADDRESS | TOPIC OF INTEREST | RESOURCE | RESOURCE | LAYOUT FORMAT |
|---|---|---|---|---|---|
| FRIEND 0 | XXXXXX | TELEVISION SHOW A | URL A | PORTAL A | |
| FRIEND 0 | XXXXXX | SPORTS TEAM X | URL X | | SQL A |
| FRIEND 0 | XXXXXX | ALMA MATER | F:\FILENAME1.CDB | | |
| FRIEND 1 | YYYYYY | TELEVISION SHOW A | URL A | PORTAL A | |
| FRIEND 1 | YYYYYY | SPORTS TEAM Y | URL Y | | |
| FRIEND 1 | YYYYYY | ALMA MATER | F:\FILENAME1.CDB | | |
| FRIEND 2 | ZZZZZZ | SPORTS TEAM X | URL X | | SQL A |

RELATIONSHIP-CENTRIC PORTALS FOR COMMUNICATION SESSIONS

BACKGROUND OF THE INVENTION

The present disclosure relates to the field of computers, and specifically to software. Still more specifically, the present disclosure relates to sharing content during a communication session.

Electronic communication sessions are sessions between two or more participants, and may occur over the Internet, by phone, etc. Oftentimes, the participants have shared interests and activities that make up a common ground between the participants. Shared interests might be a common investment, a jointly read web log (blog), shared musical tastes, or fascination with a particular celebrity. Shared activities might include a frequently played multi-player game or joint development of a document.

BRIEF SUMMARY OF THE INVENTION

Relationship-centric resources are provided to users during a communication session. After establishing a communication session between a first communication device and a second communication device, content that meets a content descriptor is retrieved. This content descriptor describes a nature of a relationship between users of the first and second communication devices. The retrieved content, which meets the content descriptor, is then simultaneously displayed on both the first communication device and the second communication device.

In one embodiment, an apparatus, for providing relationship-centric resources to users during a communication session, comprises means for establishing a communication session between a phone and a call center. The apparatus further comprises means for retrieving content that meets a content descriptor. This content descriptor describes a nature of a relationship between a user of the phone and the call center. This retrieved content, which meets the content descriptor, is displayed on a display of a computer that is authorized to be used by the user of the phone.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 depicts a lookup table that contains information that describes the relevant content;

DETAILED DESCRIPTION OF THE INVENTION

Figure 1:
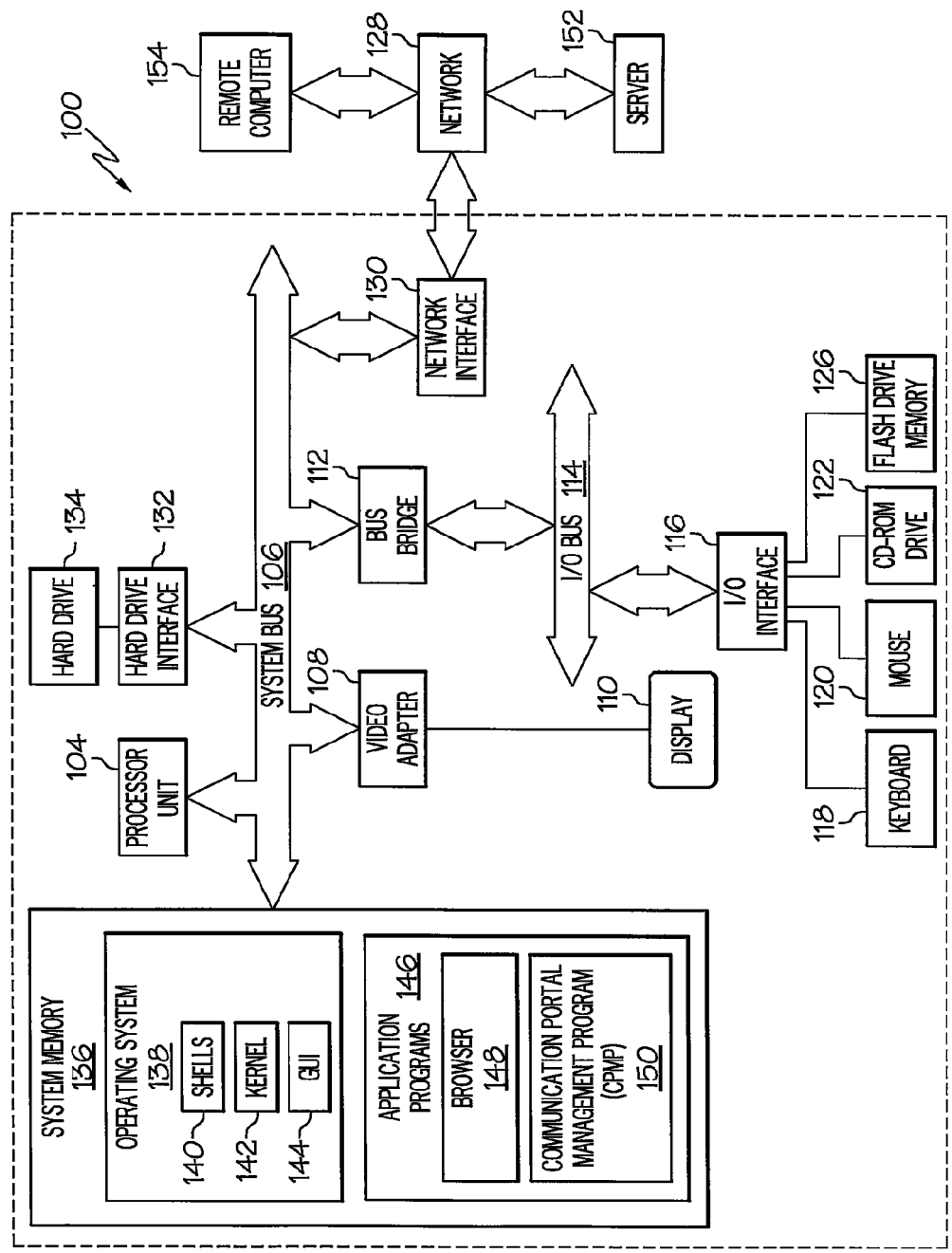
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or computer-readable storage device implemented using hardware storage components. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. P/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 152 via a network 128 using a network interface 130, which is coupled to system bus 106. Network 128 may be an external network such as the Internet, or an internal network such as an Ethernet or a Virtual Private Network (VPN). Server 152 may be architecturally configured in the manner that is substantially similar to that depicted for computer 100. Similarly, computer 100 is able to communicate with a remote computer 154, which also may utilize a substantially similar architecture as that described for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory, (not shown), including, but not limited to, cache memory, registers, and buffers. Code that populates system memory 136 includes an operating system (OS) 138 and application programs 146.

OS 138 includes a shell 140, for providing transparent user access to resources such as application programs 146. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 146. The services provided by kernel 142 include memory management, process and task management, disk management, and I/O device management. Also within OS 138 is a Graphical User Interface (GUI) 144 software logic, which provides requisite logic for displaying GUIs on display 110.

Application programs 146 include a browser 148. Browser 148 includes program modules and instructions enabling a World Wide Web (WWW) client (i.e., computer 100) to send and receive network messages to the Internet. Computer 100 may utilize HyperText Transfer Protocol (HTTP) messaging to enable communication with server 152. Application programs 146 in system memory 136 also include a Communication Portal Management Program (CPMP) 150. CPMP 150 performs the functions illustrated below in FIGS. 2-7, and may include software that describes the relationship-centric resources (e.g., portals) described in FIGS. 2 and 5. In one embodiment, computer 100 is able to download CPMP 150 from a service provider that is utilizing server 150, preferably in an "on demand" basis. Note further that, in a preferred embodiment of the present invention, server 150 performs all of the functions associated with the present invention (including the execution of CPMP 150), thus freeing computer 100 from having to use its own computing resources.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
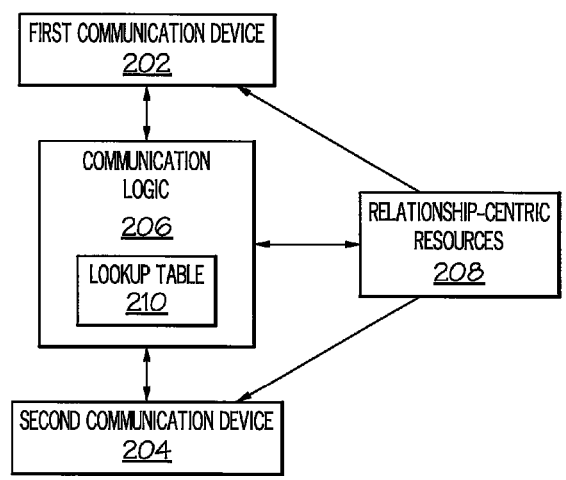
FIG. 2 illustrates relationships among communication devices and relationship-centric resources.

With reference now to FIG. 2, a high-level overview of the present invention is presented. A first communication device 202 and a second communication device 204 are in a communication session that is facilitated by communication logic 206. Communication logic 206 is any combination of software and hardware that enables first communication device 202 and second communication device 204 to communicate with each other. Such communication may include voice, data and text communication. In the case of the communication session between the first and second communication devices being an instant messaging session, then communication logic 206 is preferably an instant messaging server.

As described below, first communication device 202 may be a computer, a phone, a Personal Digital Assistant (PDA) or any other communication device operated by a first user, service, etc. Second communication device 204 is another communication device that is operated by a second user, service, etc. In accordance with software and tables found in a lookup table 210 that is accessible to communication logic 206, relationship-centric resources 208 are identified. These relationship-centric resources 208 are defined as resources that are of mutual interest to users of the first communication device 202 and the second communication device 204. In one embodiment, relationship-centric resources 208 include a portal to webpages that, in a manner described below, are relevant to a common interest of the parties that are using first communication device 202 and second communication device 204. Alternatively, relationship-centric resources 208 may be any software logic that permits access to any content that is of common interest to the parties. Note that this content may be statically defined (e.g., part of a fixed content table), or this content may be dynamically generated in response to changes to the nature of the relationship between the first and second users. That is, if a relationship changes between the two users (e.g., as suggested by a change to a lookup table that describes common interests of the two users), then the content of common interest will automatically change.

Figure 3:
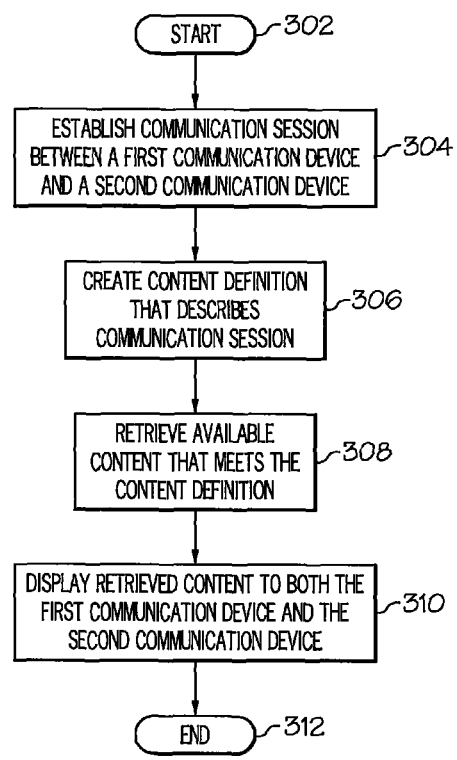
FIG. 3 is a high-level flow-chart of exemplary steps taken to provide relevant content to participants in a communication session.

With reference now to FIG. 3, a high-level flow-chart of exemplary steps taken to associate and retrieve common-interest content for users in a communication session is provided. After initiator block 302, a communication session is established between first and second communication devices (block 304). A content descriptor is (or has been) created, which describes the nature of the communication session (block 306). Based on this content descriptor, appropriate content is retrieved (block 308). The retrieved content is displayed (block 310), and the process ends (terminator block 312). Details of these exemplary steps, taken in various embodiments, are now discussed.

Establishing a Communication Session Between a First Device and a Second Device

A communication session can be established between different types of communication devices. For example, assume that two users are establishing an Instant Messaging, e-mail, Voice Over Internet Protocol (VoIP) or other computer based communication session on their respective first and second computers ("communication devices"). In this scenario, the retrieved content (discussed in detail below) will preferably be displayed on a GUI that is simultaneously displayed at both communication devices during the communication session. In this scenario, the communication logic 206 depicted above in FIG. 2 is preferably software logic that is resident on a service server, such as server 152 shown in FIG. 1. Alternatively, such communication logic 206 may be resident in the local client computer 100 and/or the remote computer 154, preferably as part of the Communication Portal Management Program (CPMP) 150.

Other types of communication devices can establish the communication session. For example, a user can be communicating with a service via a land-line phone, a cell phone, a Personal Digital Assistant (PDA), or other type of voice and/or multi-media device. In this scenario, the communication logic 206 shown in FIG. 2 is preferably part of a telecommunications system, such as that provided by a cell phone service, a switching system, etc. Nonetheless, it is assumed that such a telecommunication system will use a computer system, such as that shown in FIG. 1, to implement the appropriate software logic described herein for CPMP 150.

Creating a Content Descriptor that Describes the Communication Session

Just as there are multiple types of communication devices and communication sessions, there are also multiple ways to create a content descriptor that describes the communication session.

In one scenario, assume that the communication devices are computers, and that the communication session is an Instant messaging communication session. In this scenario, the communication logic 206 (shown in FIG. 2) can include the lookup table 210 or similar logic that is created by specific users. This lookup table can cross-reference common interests between users. That is, assume that "Friend 0" (on a local computer) and "Friend 1" (on a remote computer) are both interested in a particular television show. This common interest is stored in the lookup table, along with the names of the users. Furthermore, this lookup table may include relevant resources.

Thus, with reference to an exemplary lookup table 402 shown in FIG. 4, Friends 0 and 1 share a common interest in "Television show A," while Friends 0 and 2 share a common interest in "Sports team X." As shown in lookup table 402, the location ("URL A") of a relevant relationship-centric resource, based on a common topic of interest ("Television show A"), is also presented. This resource location is later used to retrieve and display the relevant resource for the particular topic of interest. Alternatively, the relationship-centric resources 208, shown in FIG. 2, can be a portal. That is, in response to "Friend 0" and "Friend 1" being in a communication session, they can be directed to a "Portal A," which is an access webpage that provides a consolidation of links to other resources on the World Wide Web that are relevant to "Television show A." Note that the URLs may be in HyperText Transfer Protocol (HTTP), or in a consolidation protocol, such as Network News Transfer Protocol (NNTP) or Really Simple Syndication (RSS). NNTP is used primarily by news servers to distribute relevant news articles to a user. RSS is used in a broader context for providing feeds of frequently updated digital content, such as blogs, news feeds or podcasts to a user. Both NNTP and RSS provide links to, but not the actual content of, relevant content.

Alternatively, the webpage that is "Portal A" can be auto-populated into the GUIs that are being used by "Friend 0" and "Friend 1" in their instant messaging communication session.

Note that lookup table 402 may also define a layout format for data. For example, assume that "Friend 0" and "Friend 1" went to school at the same alma mater. Selected data from a database of alumni can be presented to "Friend 0" and "Friend 1" during their communication session. This data can be tailored and designed according to a Structured Query Language (SQL) command "SQL A," which has been created by either "Friend 0," "Friend 1", or alternatively, a third party (not shown). Thus, when displayed on the parties' GUIs during their communication session, this data will have the same content, appearance and layout for both parties. Alternatively, the descriptor file, shown as "SQL A", for the content may be an eXtensible Markup Language (XML) file or any other suitable markup language file.

In the scenario described above, the content found in the relationship-centric resources 208 (and directions to such content) are manually entered by users, in accordance with their name, e-mail or instant messaging address, and topic of interest.

Figure 5:
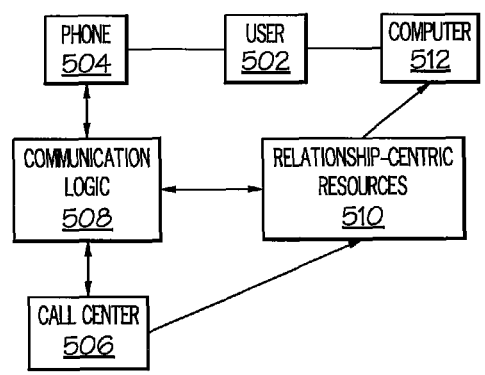
FIG. 5 illustrates, in an alternate embodiment, relationships among a user's phone, a call center, relationship-centric resources, and the user's computer for displaying relevant content.

In another scenario, content in relationship-centric resources can be auto-created. For example, assume that the first communication device is a phone and that the second communication device is a call center. Referring now to FIG. 5, assume, for explanatory purposes, that a user 502 is using a phone 504 (land-line, cell, VoIP, etc.) to call a call center 506. This call is facilitated by a communication logic 508, which not only connects the telephone call from the phone 504 to the call center 506, but also has logic similar to that described above in FIG. 2 for accessing relationship-centric resources 510. Thus, assume that communication logic 508 includes a lookup table (not shown) that includes the telephone number for phone 504, as well as account history that is associated with that telephone number. When phone 504 calls the call center 506, the communication logic 508 is able to identify the caller, and will automatically direct the appropriate resource (from relationship-centric resources 510) to a computer 512 that is associated with user 502. For example, assume that user 502 is calling (from phone 504) the call center 506 to discuss the shipping status of a package that is being delivered. By looking up the caller's phone number, the communication logic can automatically retrieve a webpage or other resource that shows the real-time shipping status of the relevant package, which is displayed on the user's computer 512. Alternatively, either the user (via phone 504) or the call center 506 can manually enter information such as a tracking number for the shipped package, which results in the appropriate resource in relationship-centric resources 510 being presented on computer 512. Note that in one embodiment, the relationship-centric resources 510 are displayed on a monitor (e.g., display 110 shown in FIG. 1) only as long as the phone 504 and call center 506 are in communication. After the user hangs up the phone 504, the relationship-centric resources 510 are automatically removed from the display on the computer 512.

Retrieving Available Content that Meets the Content Descriptor

Figure 6:
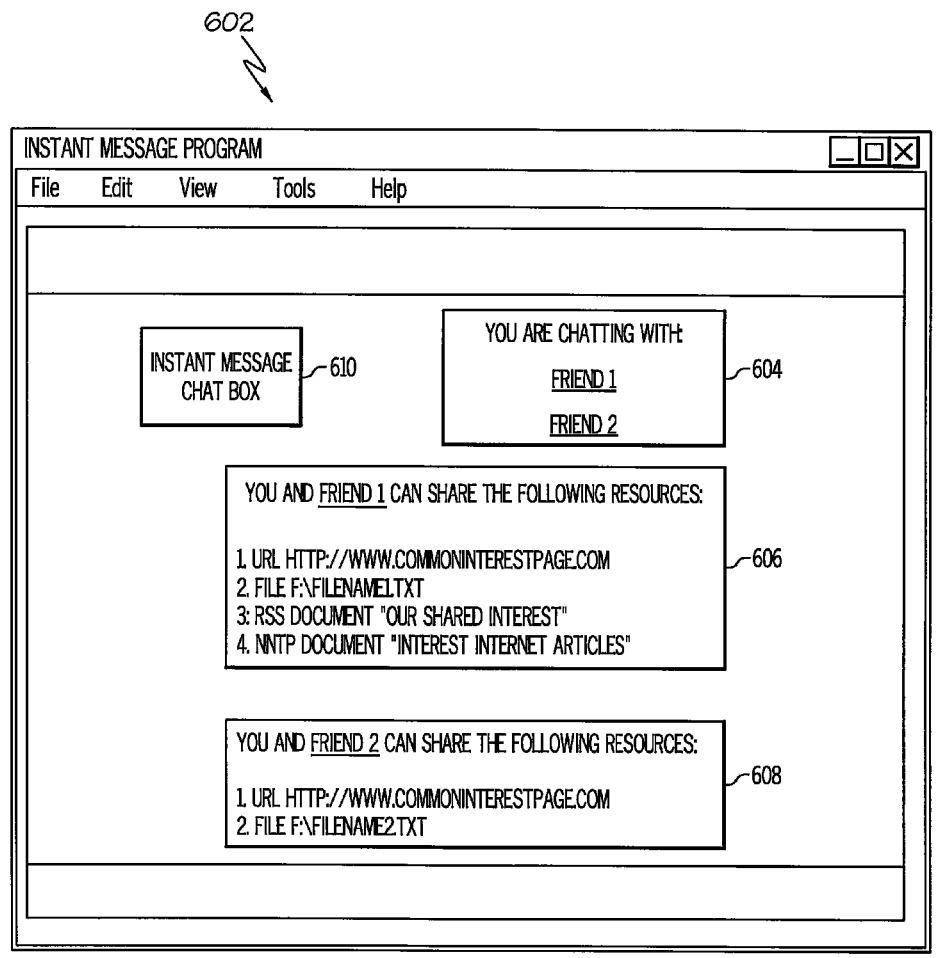
FIG. 6 depicts an exemplary Graphical User Interface (GUI) showing what relevant content is available to one or more participants in a communication session.
Figure 7:
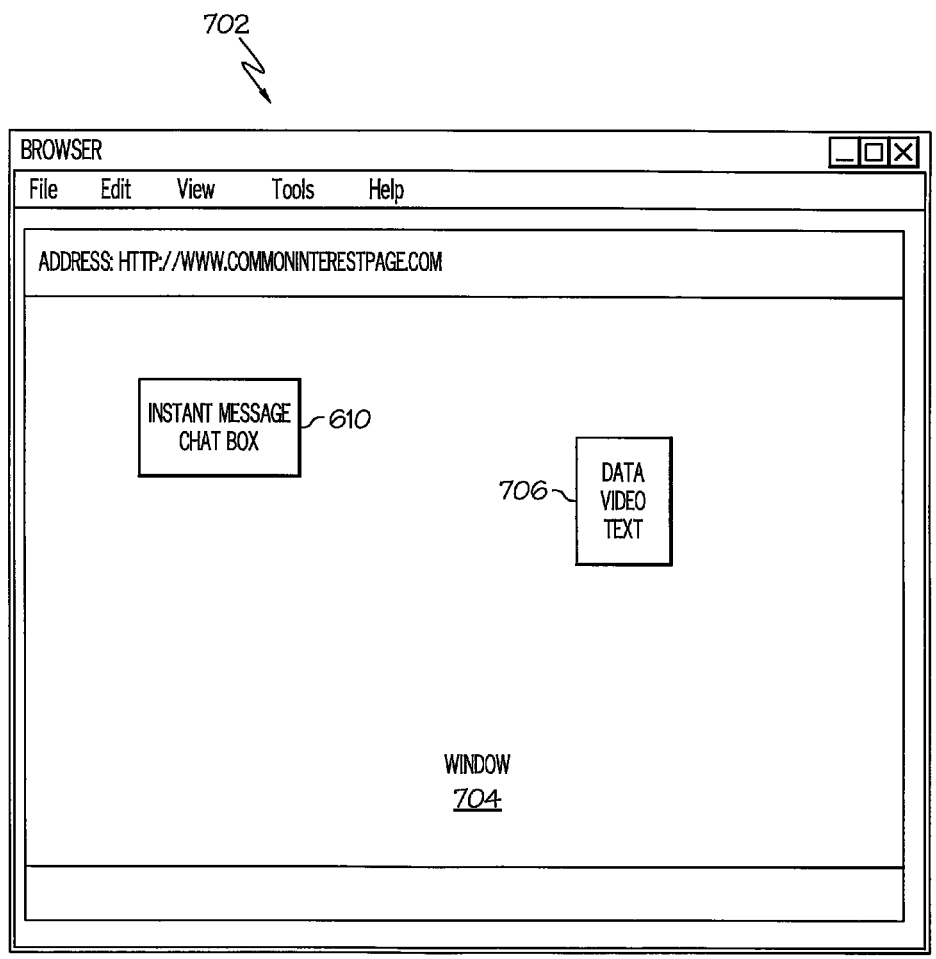
FIG. 7 illustrates a GUI displaying selected relevant content to the one or more participants depicted in FIG. 6.

Retrieval of the relevant content is based on the URL or other locator provided in the lookup tables described above. This retrieval can be automatic (based on the participants in a communication session having a same topic of interest) or manual. An exemplary manual implementation is shown in FIG. 6. A GUI 602 for an Instant messaging program (i.e., a program that permits text/voice inputs to be communicated in real-time between the two users' computers) is presented. As shown in box 604, the local user ("Friend 0") is in a chat session with two other users ("Friend 1" and "Friend 2"). As shown in block 606, and based on an underlying lookup table such as those described above, "Friend 0" and "Friend 1" intuitively should share four different resources based on their four common interests. Likewise, "Friend 0" and "Friend 2" share two resources based on their two shared interests, as described in block 608. Note that "Friend 0" is able to type instant text messages into chat box 610, and that real-time text messages from "Friend 1" and "Friend 2" are received and read in the same chat box 610.

Displaying Retrieved Content to Both the First Communication Device and the Second Communication Device Assume now that "Friend 0" clicked a hyperlink for "http://www.commoninterestpage.com", as displayed in block 606. This results in a browser, shown in FIG. 7 as part of GUI 702, displaying in window 704 not only the chat box 610, but also a data, video and/or text content 706 that is presented by the webpage found at the URL "http://www-.commoninterestpage.com". This same information (shown in FIG. 7) is simultaneously displayed on a GUI that is used by "Friend 1," thus allowing "Friend 0" and "Friend 1" to view the same content together during their instant messaging session.

Note that the information displayed at content 706 may be any content that is relationship-centric. For example, assume that a husband and wife are instant messaging. Based on their profile, the content 706 that is displayed may include a joint bank account's information, local weather, on-line "to do" lists, each other's personal calendars, listings at a local movie theater, etc. This content may be arranged in a toolbar, which is displayed whenever the instant messaging session is initiated, thus reminding the couple of tasks and other plans that they have separately or together.

Note that the displayed content 706 might be overwriting existing content on GUI 702, which a user may wish to remain displayed. Such a conflict prompts the user to merge or overwrite the local (existing displayed) content and layout metadata. This change to the format and positioning of the incoming content 706 will automatically be reflected in the underlying lookup table (e.g., lookup table 402), but only for the line relevant to the user who overrode/changed the layout for the shared content.

As described herein, the present disclosure presents a novel and useful means for persisting a collection of content and applications that are associated with a relationship represented by a contact entry. The presently disclosed process' usefulness is derived from, among other items, the ability to present relevant material, to participants in a communication session, which is not transient or obscure, but rather is readily available for joint viewing by both participants during the communication session. This material may be the result of either an intersection of interests (such as that described in a lookup table detailed above), or in a unilateral assessment of an interest. In the unilateral assessment, either party to the communication session may manually identify resources of mutual interest, or this identification can be performed by data mining (by either party) to determine intuitively what resources would be of interest to both parties for simultaneous presentation during the communication session.

Note also that, in a preferred embodiment, the layout and format of the shared content is fixed by one or both of the communication session participants. Examples of such shared content include, but are not limited to, clipped on-line content, feeds, documents, playlists, applications, webpages, portals and other on-line media.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for providing relationship-centric resources to users during a communication session, the method comprising:
    establishing a communication session between a first communication device and a second communication device;
    determining, during the communication session between the first and second communication devices, an intersection of mutual topics of interest between users of the first and second communication devices by cross-referencing sets of interests for the users;
    retrieving content based on a determination that the content meets a content descriptor, wherein the content descriptor describes a nature of the communication session between the first and second communication devices, and further based on a determination that the content is related to a mutual topic of interest from the intersection of mutual topics of interest between the users of the first and second communication devices, wherein the determination of relatedness is based on a cross-reference between the content and the mutual topic of interest, wherein the cross-reference is stored in a lookup table prior to establishing the communication session; and
    simultaneously displaying, at the first and second communication device, the retrieved content.

2. The method of claim 1, wherein locations for accessing the retrieved content are stored in the lookup table.

3. The method of claim 2, wherein the locations are defined by Universal Resource Locators (URLs).

4. The method of claim 2, wherein a display format for the received content is predefined by a user of the first communication device, and wherein the display format is stored in the lookup table.

5. The method of claim 1, wherein the communication session is an instant messaging session between the first and second communication devices.

6. The method of claim 5, wherein the retrieved content is simultaneously displayed with a chat box on a Graphical User Interface (GUI) at each of the first and second communication devices.

7. The method of claim 1, wherein the retrieved content is a portal.

8. The method of claim 1, wherein the retrieved content is data from a database.

9. The method of claim 1, wherein the first communication device is a phone, and wherein the second communication device is a service provider's server.

10. The method of claim 1, further comprising:
    presenting multiple retrieved content to the user;
    receiving a selection input from the user, wherein the selection input indicates which of the multiple retrieved content are to be displayed as selected content on the first and second communication devices; and
    displaying the selected content on the first and second communication devices.

11. The method of claim 1, wherein the content descriptor is statically defined.

12. The method of claim 1, wherein the content descriptor is dynamically generated in response to changes to the nature of the communication session between users of the first and second communication devices.

13. An apparatus for providing relationship-centric resources to users during a communication session, the apparatus comprising:
    communication logic implemented in a hardware-based system, wherein the communication logic is configured to establish a communication session between a phone and a call center;
    wherein the communication logic is further configured to determine, during the communication session between the first and second communication devices, an intersection of mutual topics of interest between a user of the phone and the call center by cross-referencing sets of interests for the user and the call center, wherein the sets of interests are stored in a lookup table prior to establishment of the communication session;
    wherein the communication logic is further configured to retrieve content that meets a content descriptor, wherein the content descriptor describes a nature of the communication session between the first and second communication devices, and the content is related to a mutual topic of interest from the intersection of mutual topics of interest between the user of the phone and the call center;
    wherein the communication logic is further configured to send the retrieved content to a computer associated with the phone to display the retrieved content, which meets the content descriptor, on a display of a computer that is authorized to be used by the user of the phone; and
    wherein the communication logic is further configured to send the retrieved content to be displayed on a display at the call center, wherein the displaying on the display at the call center is simultaneous with the displaying on the display of the computer authorized to be used by the user of the phone.

14. The apparatus of claim 13, wherein the communication logic is further configured to remove, in response to the communication session ending, the retrieved content from the display of the computer of the user.

15. The apparatus of claim 13, wherein the content descriptor is based on a telephone number for the phone of the user, and wherein the retrieved content is specific for the user.

16. A computer-readable storage device encoded with a computer program, the computer program comprising computer executable instructions which, when executed on a processor within a computer, are configured for:
    establishing a communication session between a first communication device and a second communication device;
    determining, during the communication session between the first and second communication devices, an intersection of mutual topics of interest between users of the first and second communication devices by cross-referencing sets of interests for the users;
    retrieving content based on a determination that the content meets a content descriptor, wherein the content descriptor describes a nature of the communication session between the first and second communication devices, and further based on a determination that the content is related to a mutual topic of interest from the intersection of mutual topics of interest between the users of the first and second communication devices, wherein the determination of relatedness is based on a cross-reference between the content and the mutual topic of interest, wherein the cross-reference is stored in a lookup table prior to establishing the communication session; and simultaneously displaying the retrieved content both on a display at the first communication device and on a display at the second communication device.

17. The computer-readable medium of claim 16, wherein locations for accessing the retrieved content are stored in the lookup table.

18. The computer-readable medium of claim 16, wherein the communication session is an instant messaging session, and wherein the retrieved content is simultaneously displayed with a chat box on a Graphical User Interface (GUI) at each of the first and second communication devices during the instant messaging session.

19. The computer-readable medium of claim 16, wherein the retrieved content is a portal.

* * * * *